P. CESEN.
TIRE CHAIN FASTENING DEVICE.
APPLICATION FILED FEB. 26, 1919.
1,313,368.
Patented Aug. 19, 1919.
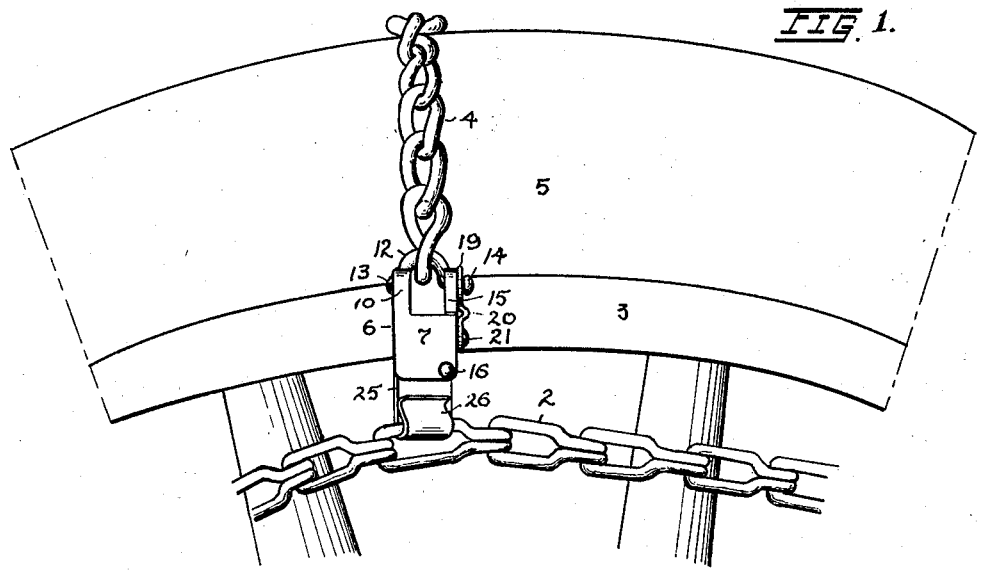
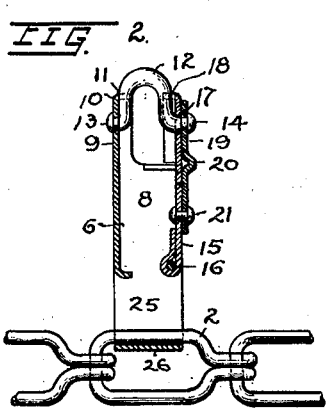
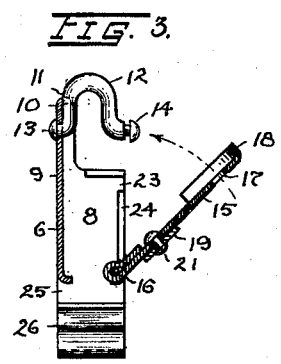
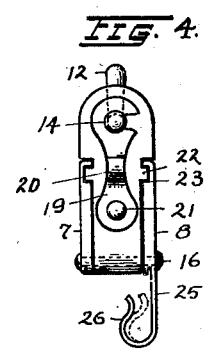
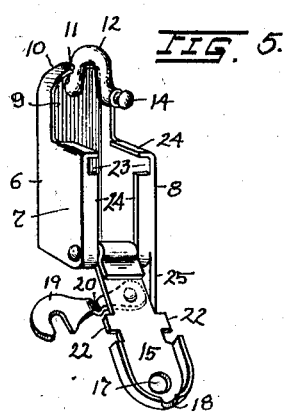
Witness
Geo. E. Kricker.
Inventor
PAUL CESEN.
Attorneys

UNITED STATES PATENT OFFICE.

PAUL CESEN, OF CLEVELAND, OHIO.

TIRE-CHAIN-FASTENING DEVICE.

1,313,368.         Specification of Letters Patent.       Patented Aug. 19, 1919.

Application filed February 26, 1919. Serial No 279,259.

*To all whom it may concern:*

Be it known that I, PAUL CESEN, a subject of the Government of Austria, and who have declared my intention of becoming a citizen of the United States, residing at Cleveland, in the county of Cuyahoga and State of Ohio, have invented certain new and useful Improvements in Tire-Chain-Fastening Devices, of which the following is a specification.

My invention relates to a detachable link for tire chains, and the object of the invention is to provide means adapting quick and convenient connection and disconnection of two chains and to make a strong and safe connection for said chains.

In the accompanying drawing, Figure 1 is a side view of a portion of a wheel showing my improved detachable link connecting a pair of chains. Fig. 2 is a longitudinal section of my detachable link closed and locked, and Fig. 3 is a similar view showing the link unlocked and partly open. Fig. 4 is a side elevation of the link as it appears when locked, and Fig. 5 is a perspective view showing the link open.

In equipping an automobile wheel with a tire chain the common practice is to provide a side chain 2 at each side of the wheel and connect them with tread chains 4 placed transversely across the tire 5. To facilitate the attachment and removal of such chains I provide a separate link 6 of special construction consisting of a sheet-metal body stamped or otherwise formed into an angular shape with two parallel side walls 7 and 8 and an end wall 9 of relatively greater length having a rounded upper end which is flanged for strength, and which has a notch 11 in its flanged border adapted to receive a yoke or U-shaped member 12 having extremities bent in opposite directions. One of these extremities 13 is riveted to end wall 9 of body 6, and the opposite extremity 14 is adapted to be engaged by a plate 15 which is hinged on body 6 at 16 and provided with an opening 17 to receive the extremity 14 and is also rounded and flanged at its free end and provided with a notch 18 adapted to fit partly around the round outer leg of member 12 when the plate is placed parallel with wall 9. In this position the plate may be locked by a latch 19 which is pivoted upon the outer face of plate 15 and adapted to hook-engage the headed end 14, see Fig. 4. The latch 19 is preferably of spring metal and has a bent portion or loop 20 to promote a spring action and to provide a finger hold to turn the latch on its pivot 21. Plate 15 is also provided with lateral ears or projections 22 which are adapted to occupy notches 23 in the flanged edges 24 of side walls 7 and 8, whereby the pull or strain on plate 15 is in part placed upon side walls 7 and 8 and not all upon pivot pin 16. An integral extension 25 of wall 8 is bent into the form of a clip or hook 26 adapted to engage and hold any one of the links of side chain 2, while the tread chain 4 is adapted to have detachable link connection with the hook member 12.

As shown my improved detachable link is intended to be sold as a separate article of manufacture and used to unite two chains such as described, but it may be employed for any other purpose where a safe and secure detachable connection is required.

What I claim is:

1. A detachable link for tire chains, comprising a body member having an open hook at one end thereof and a plate hinged at one side of said member and having an opening adapted to receive said hook, and a pivoted latch adapted to engage said hook to lock the plate in closed position.

2. A detachable link for tire chains, comprising a sheet metal body having side walls provided with notched border flanges, a plate hinged between said side walls having projections adapted to occupy said notches, and a hook member for said plate and body adapted to provide a chain connection.

3. A body formed of sheet metal having a hook member extending from one end thereof and a separate U-shaped member affixed to the opposite end thereof, a plate hinged to said body having an open end adapted to interlock with said U-shaped member, and a latch pivoted on said plate adapted to interlock with said U-shaped member.

4. A sheet metal body having side walls and extensions at opposite ends of said walls and a hook at the end of each extension, a plate hinged upon said body to engage one of said hooks, and a spring latch adapted to lock said plate in a closed position.

5. In tire chains, a detachable link adapted to connect the tread chain with the side chain and comprising a sheet metal body of angular formation and separate hook members thereon at opposite ends and at right angles to each other, and a plate hinged on said body having a latch adapted to interlock with one of said hook members.

6. A detachable link for tire chains comprising a body having spaced side walls and a plate hinged at one end therebetween, a U-shaped hook member supported by said body and plate respectively, and a latch adapted to lock said hook member and said plate together.

Signed at Cleveland, in the county of Cuyahoga, and State of Ohio, this 22nd day of February, 1919.

PAUL CESEN.